United States Patent [19]

Schürhörster

[11] Patent Number: 5,586,938
[45] Date of Patent: Dec. 24, 1996

[54] TOOTHED TORQUE TRANSMITTING DEVICE HAVING REINFORCEMENT RIBS

[75] Inventor: Josef Schürhörster, Rheine, Germany

[73] Assignee: KTR Kupplungstechnik GmbH, Rheine, Germany

[21] Appl. No.: 197,585

[22] Filed: Feb. 17, 1994

[30] Foreign Application Priority Data

Nov. 26, 1993 [DE] Germany ............................ 9318139 U

[51] Int. Cl.$^6$ ............................................................ F16D 3/56
[52] U.S. Cl. .................................................. 464/92; 464/98
[58] Field of Search ...................................... 464/93, 87, 98, 464/137, 147, 92; 192/106.1

[56] References Cited

U.S. PATENT DOCUMENTS

| 3,788,099 | 1/1974 | Miller | 464/98 |
| 3,861,172 | 1/1975 | Symann . | |
| 3,901,047 | 8/1975 | Pletsch et al. | 464/93 |

FOREIGN PATENT DOCUMENTS

| 146582 | 7/1951 | Australia | 464/93 |
| 371128 | 4/1932 | United Kingdom | 464/93 |

OTHER PUBLICATIONS

Bowex brochure (12 pages), Couplings for Engine Drives.

Primary Examiner—Daniel P. Stodola
Assistant Examiner—Emmanuel M. Marcelo
Attorney, Agent, or Firm—Darby & Darby, P.C.

[57] ABSTRACT

A device which can transmit torque between a first component (e.g., a flywheel) and a coaxial or nearly coaxial second component (such as a hydraulic drive) has an internally toothed hub which transmits torque to or receives torque from one of the components, and a flange which surrounds the hub and transmits torque to or receives torque from the other component. The flange has a disc disposed in a plane normal to the axis of the hub, a rim spaced apart from the hub and surrounding the disc, and pairs of reinforcing ribs defining acute angles which diverge from the rim toward the hub. The ribs of each pair are or can be mirror images of each other with reference to a plane located between such ribs and including the axis of the hub. One rib of each pair is subjected to tensional stresses and the other rib of each pair is subjected to compressive stresses when the one component rotates the hub or vice versa. The device can be made, at least in part, of a plastic material. Each rib can include a first portion at one side and a second portion at the other side of the disc. The flange can be connected to the other component by bolts, screws or the like having shanks extending through axially parallel holes in the enlarged radially outermost portions of the ribs; such radially outermost portions are or can be of one piece with the rim and with the disc.

20 Claims, 2 Drawing Sheets

's,586,938

TOOTHED TORQUE TRANSMITTING DEVICE HAVING REINFORCEMENT RIBS

BACKGROUND OF THE INVENTION

The present invention relates to improvements in torque transmitting devices, and more particularly to improvements in internally toothed torque transmitting devices. Still more particularly, the invention relates to improvements in torque transmitting devices which can be utilized with advantage in torsionally stiff engine couplings for hydrostatic systems as well as many additional purposes.

U.S. Pat. No. 3,861,172 (granted Jan. 21, 1975 to Heinz George Symann "Coupling for combustion engine") discloses an internally toothed torque transmitting device (called flange) which can be used to transmit torque to a pinion having an annulus of crowned external teeth. The patented torque transmitting device and the pinion can move relative to each other in the radial direction and can also transmit torque in positions in which their axes are inclined relative to each other. The torque transmitting device of Symann employs a metallic disc of one piece with an internal sleeve which surrounds an internal gear having axially parallel teeth movable into and out of mesh with the crowned teeth of the pinion. A drawback of the patented torque transmitting device is that it is rather heavy, bulky and expensive. Furthermore, the thickness of the disc-shaped metallic portion of the patented device is directly proportional to the magnitude of torque which can be transmitted to or from the pinion.

It is also known to provide the torque transmitting device of Symann with reinforcing ribs each extending radially from a centrally located hub to a rim which is spaced apart from and surrounds the hub. The radially extending ribs are of one piece with a relatively thin washer-like part which extends between the hub to the rim and one side of which is of one piece with the ribs. A drawback of such devices is that they cannot be utilized for transmission of torque between a piston type combustion engine and a driven part. The magnitude of torque which is being transmitted by the output element of a piston type engine to a flywheel and thence to the aforementioned torque transmitting device employing a washer-like disc and radially extending reinforcing ribs of one piece with one side of the disc will fluctuate whenever a piston of the engine completes its forward stroke and proceeds to perform a return stroke as well as when a piston completes its rearward stroke and begins the next-following forward stroke. Such fluctuations of transmitted torque cause the reinforcing ribs to undergo very pronounced dynamic bending stresses. The only presently known remedy is to increase the dimensions of the reinforcing ribs and of the entire torque transmitting device. Thus, it is necessary to produce and store a number of larger and smaller torque transmitting devices in order to ensure that the selected device will be capable of withstanding the aforediscussed dynamic bending stresses.

OBJECTS OF THE INVENTION

An object of the invention is to provide a rotary torque transmitting device which constitutes an improvement over and a further development of the device disclosed in U.S. Pat. No. 3,861,172.

Another object of the invention is to provide a device which is constructed and configurated in such a way that it can transmit torque in apparatus or machines wherein the magnitude of torque is likely to fluctuate within a wide range.

A further object of the invention is to provide a torque transmitting device of the above outlined character which can be employed as a superior substitute for heretofore known torque transmitting devices in existing machines and/or apparatus and/or power trains.

An additional object of the invention is to provide a simple, lightweight and inexpensive torque transmitting device which can be utilized with advantage for the transmission of torque between a rotary flywheel and a hydraulic drive, e.g., between the rotary flywheel on the output element of an engine and the shaft of a pump.

Still another object of the invention is to provide novel and improved reinforcing means between a hub and a rim of the above outlined torque transmitting device.

A further object of the invention is to provide a lightweight and compact device which is capable of transmitting torques much larger than conventional devices having identical dimensions.

Another object of the invention is to provide a torque transmitting device which requires little maintenance or no maintenance at all.

An additional object of the invention is to provide a torque transmitting connection which employs the above outlined torque transmitting device.

Still another object of the invention is to provide a pump-motor aggregate which employs the above outlined torque transmitting device.

A further object of the invention is to provide a novel and improved method of stiffening or reinforcing a flange between a centrally located hub and a peripheral rim of a rotary torque transmitting device.

Another object of the invention is to provide a novel and improved array of reinforcing elements for use in a torque transmitting device of the above outlined character.

An additional object of the invention is to provide a novel and improved flange for use in the above outlined torque transmitting device.

SUMMARY OF THE INVENTION

The invention is embodied in a device for transmitting torque between a rotary driving component and a rotary driven component. For example, one of these components can include, constitute or form part of a flywheel, and the other of these components can form part of a hydraulic drive, e.g., a diesel hydraulic drive. The improved torque transmitting device comprises a hub having an axis of rotation and including internal teeth which serve to transmit torque between the hub and one of the components (e.g., from the hub to a part of a hydraulic drive), and a flange which surrounds the hub and includes a plurality of sets of elongated reinforcing elements (e.g., in the form of ribs). The sets of reinforcing elements are spaced apart from each other in a circumferential direction of the hub, and each such set includes first and second reinforcing elements which converge toward each other at an oblique angle radially outwardly of the hub. The first and second reinforcing elements of each set are or can be mirror images of each other with reference to a plane which is disposed between the respective first and second reinforcing elements and includes the rotational axis of the hub, and the improved torque transmitting device also comprises means for transmitting torque between the flange and the other component (e.g., for transmission of torque from a flywheel to the flange).

The first and second reinforcing elements of each set of such elements preferably make an acute angle. The angles which are defined by the first and second reinforcing elements of each set of such elements can be identical. It is often sufficient to provide the flange with not more than ten sets of reinforcing elements.

The means for transmitting torque between the flange and the other component is preferably remote from the hub. Such torque transmitting means can include enlarged portions of the first and second reinforcing elements of some sets or all sets of such elements. Each enlarged portion can be provided with at least one through hole or bore extending in at least substantial parallelism with the rotational axis of the hub. The axis of each such hole or bore can be parallel to the axis of the hub and is preferably disposed in the respective plane, i.e., in the mirror symmetry plane between the respective first and second reinforcing elements.

The flange preferably further comprises a rim (e.g., in the form of a short cylinder which is coaxial with and spacedly surrounds the hub). The rim surrounds the sets of reinforcing elements and the torque transmitting means. The arrangement is preferably such that the first and second reinforcing elements of each set diverge from each other in a direction from the rim toward the hub. The aforementioned enlarged portions of the reinforcing elements can be of one piece with the rim, and their holes or bores serve to receive the shanks of bolts, screws or other suitable fasteners which secure the flange to the other component.

The improved torque transmitting device is preferably shaped in such a way that the two end faces of the rim are disposed in parallel planes which are at least substantially normal to the axis of the hub. Furthermore, each of the enlarged portions can be located in one of the two parallel planes. Moreover, each of the reinforcing elements can extend all the way between the two parallel planes.

At least the internal teeth of the hub can be made of or can contain a suitable plastic material (e.g. nylon reinforced with fiberglass). It is also possible to make the entire hub and/or the entire flange of a plastic material. The torque transmitting means can further comprise metallic inserts in the flange. Each such insert can constitute a sleeve which is embedded in the plastic material of the flange and defines one of the aforementioned bores or holes.

The flange can further comprise a disc disposed in a plane which is at least substantially normal to the rotational axis of the hub. The disc can be of one piece with at least some of the reinforcing elements and its thickness is or can be a fraction (e.g., one third) of the axial length of the hub. Each reinforcing element can have two portions which are disposed at opposite sides of the disc.

The apices of the sets of reinforcing elements are remote from the hub (they can be of one piece with the rim of the flange), and such apices are preferably equidistant from each other in the circumferential direction of the hub.

The novel features which are considered as characteristic of the invention are set forth in particular in the appended claims. The improved torque transmitting device itself, however, both as to its construction and its mode of operation, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
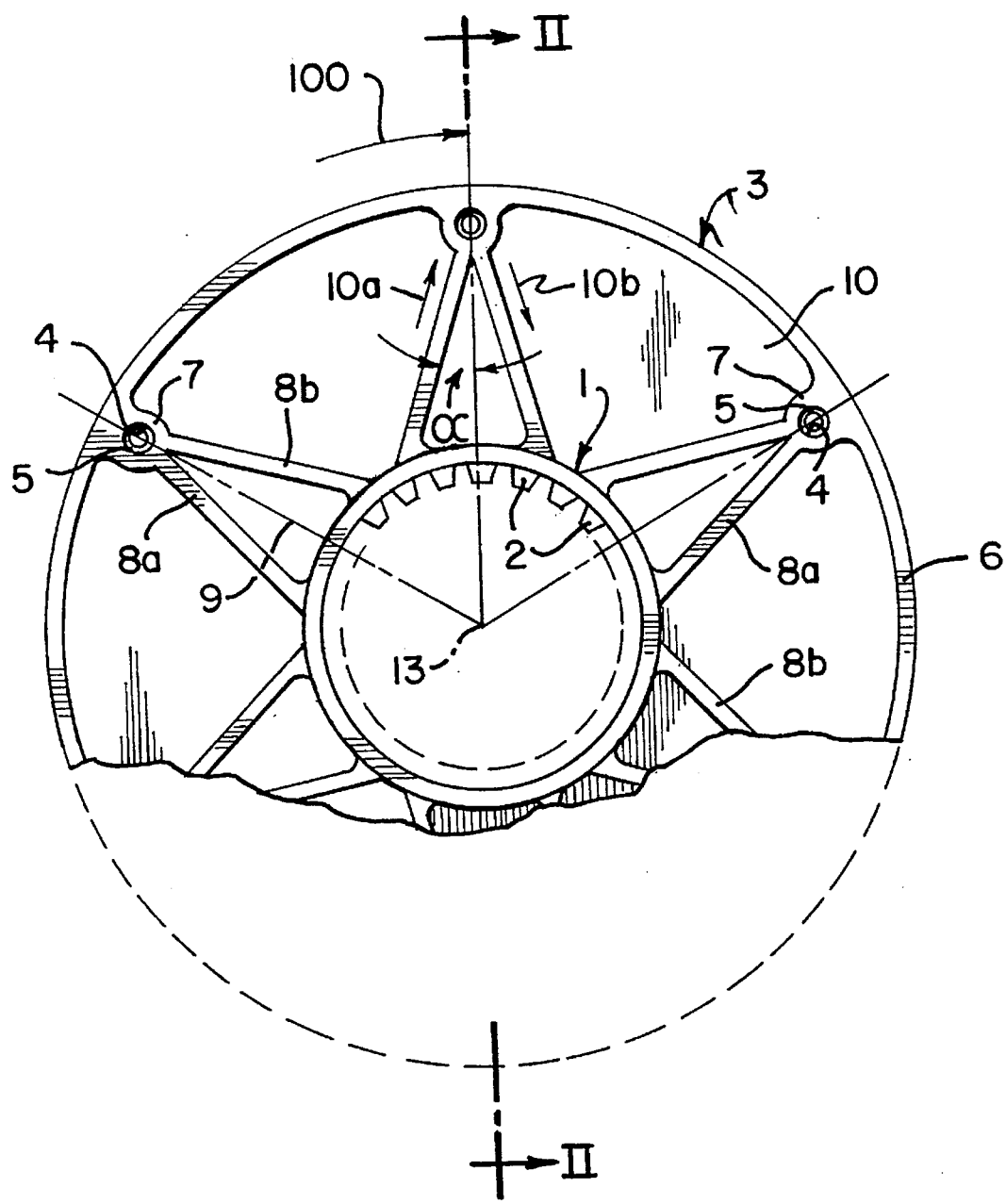
FIG. 1 is a partially schematic elevational view of a torque transmitting device which embodies one form of the present invention.

The drawings illustrate a substantially wheel-shaped torque transmitting device including a relatively short cylindrical hub 1 having an annulus of straight axially parallel internal teeth 2, and a novel and improved flange 3. The latter comprises a relatively thin disc 10 which is of one piece with and surrounds an intermediate portion of the hub 1, a substantially cylindrical rim 6 which is of one piece with the radially outer portion of the disc 10 and is coaxial with the hub 1, and six sets or pairs of elongated reinforcing elements in the form of ribs 8a, 8b. The device further comprises means for connecting the flange 3 to a driving or driven component, not specifically shown, for example, to a flywheel on the rotary output element of an engine or motor. The torque transmitting means includes enlarged radially outermost portions 7 of the ribs 8a, 8b; such enlarged portions 7 are of one piece with the disc 10 as well as with the rim 6.

Each rib 8a or 8b comprises a first portion disposed at one side and a second portion disposed at the other side of the disc 10. The end faces of the rim 6 are disposed in two parallel planes 11, 12 which are normal to the rotational axis 13 of the hub 1. Each enlarged portion 7 and each of the ribs 8a, 8b extends all the way between the planes 11 and 12. The axial length of the rim 6 is less than the axial length of the hub 1.

At least the teeth 2 of the hub 1 can be made of a suitable plastic material, e.g., nylon. It is presently preferred to make the entire torque transmitting device of a single piece of synthetic plastic material. i.e., the teeth 2 can be of one piece with the cylindrical radially outer part of the hub 1, the latter can be of one piece with the disc 10, and the disc can be of one piece with the ribs 8a, 8b, their enlarged portions 7, and the rim 6.

A flywheel which can be separably connected to the flange 3 of the improved torque transmitting device is shown in FIG. 1 of the aforementioned copending patent application Ser. No. 07/683,485 of Scherner et al. This application further shows a pinion with crowned external teeth which can be utilized to transmit torque to or to receive torque from the hub 1 of the improved torque transmitting device. The disclosure of the copending patent application Ser. No. 07/683,485 is incorporated herein by reference. The pinion can serve to transmit torque to a pump or another hydrostatic system.

The enlarged portions 7 at the outer ends of the pairs or sets of ribs 8a, 8b are provided with axially parallel bores or holes 4 for the shanks of bolts, screws or other suitable fasteners (not shown) which are selected to preferably separably secure the flange 3 to a rotary driving or driven component. Suitable fasteners are shown in the aforementioned copending patent application Ser. No. 07/683,485 of Scherner et al.

In order to avoid plastic deformation of the material of the enlarged portions 7 of the torque transmitting means of the improved device by the fasteners of the torque transmitting means, each hole or bore 4 preferably contains a cylindrical sleeve 5 which can be made of a suitable metallic material and serves as a distancing element between the driving or driven component carrying the flange 3 and the head of the respective fastener. For example, the sleeve-like inserts 5 can be made of steel.

Figure 2:
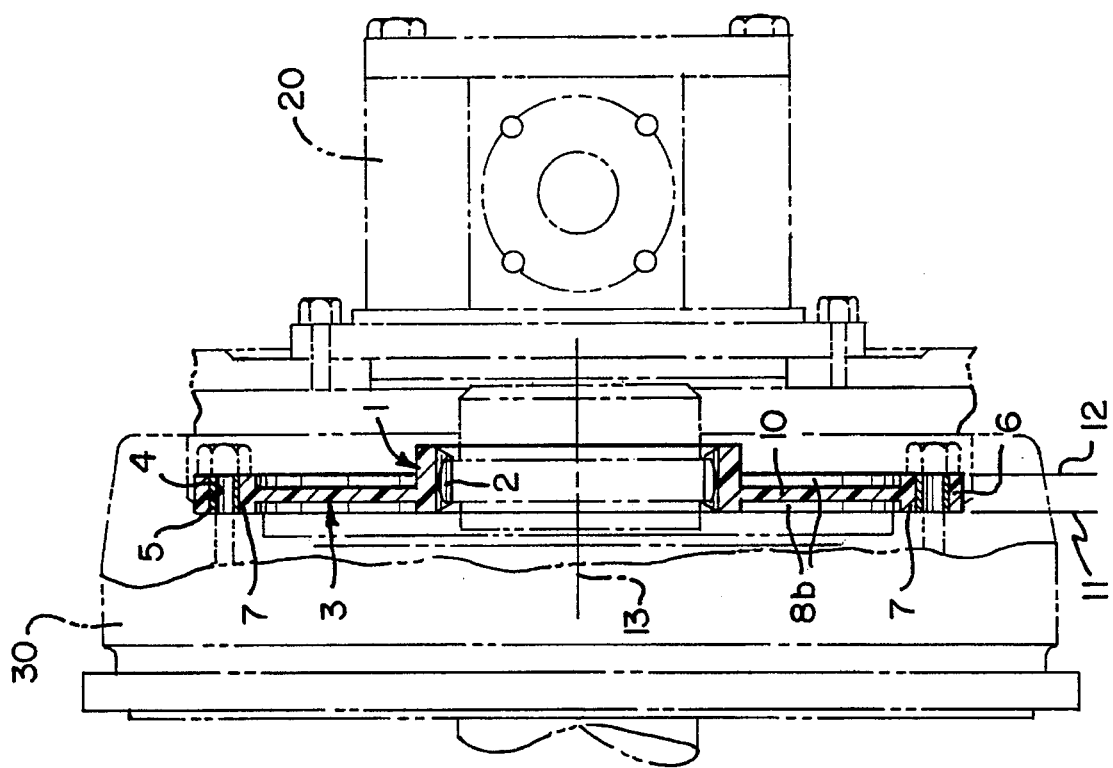
FIG. 2 is an axial sectional view of the device substantially as seen in the direction of arrows from the line II—II in FIG. 1, connected between a hydraulic drive and a flywheel.

The ribs 8a, 8b of each pair or set make acute angles 2α and diverge from each other in a direction from the rim 6 toward the external surface of the hub 1. The apices of the pairs of ribs 8a, 8b are equidistant from each other in the circumferential direction of the rim 6 and hub 1, and each angle 2α is an oblique angle, preferably a relatively small acute angle. The ribs 8a, 8b of each pair or set are preferably mirror images of each other with reference to a symmetry plane 9 which includes the axis 13 of the hub 1 and is disposed between the respective pairs of ribs. The illustrated flange 3 is provided with six pairs or sets of ribs 8a, 8b. Referring now to FIG. 2, the torque transmitting device may be used to transmit torque between a hydraulic drive 20 and a flywheel 30. The number of such sets of ribs can be increased above or reduced to less than six.

When the improved torque transmitting device is put to use (e.g., to transmit torque between a flywheel which is driven by a combustion engine or by a motor and a gear having crowned external teeth and mating with the hub 3) and the device is assumed to be driven (by the flywheel) in the direction of the arrow 100, one rib (8b) of each pair or set of ribs is subjected to compressive stresses (as indicated by the arrow 10b) and the other rib (8a) of the same pair or set is subjected to tensional stresses (as indicated by the arrow 10a). Thus, the force which is transmitted to any one of the enlarged portions 7 of the means for transmitting torque between the flywheel and the flange 3 is divided into two components, i.e., the force is divided between the ribs 8a and 8b. Thus, it is possible to transmit large forces by resorting to a relatively small and compact torque transmitting device. Alternatively, if the dimensions of the improved device match the dimensions of a conventional device, the improved device can be used for the transmission of larger torques. This is accomplished by resorting to the novel distribution of ribs 8a, 8b, i.e., the pairs of ribs make acute angles and are disposed at the opposite sides of the respective planes 9 including the axis 13 of the hub 1. The inclination of each rib 8a relative to the respective plane 9 is preferably the same as the inclination of the respective rib 8b relative to the same plane 9. In their entirety, the sets of ribs 8a and 8b constitute a substantially star-shaped array which is disposed between the hub 1 and the rim 6.

The manner in which the hub 1 and a pinion with crowned teeth can be tilted and/or moved axially relative to each other without interrupting the torque transmitting connection is the same as or analogous to that described in the patent application Ser. No. 07/683.485 of Scherner et al.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. A device for transmitting torque between a rotary driving component and a rotary driven component, comprising a hub having an axis of rotation and including internal teeth arranged to transmit torque between said hub and one of said components; a flange surrounding said hub and including a plurality of sets of elongated reinforcing elements, said sets being spaced apart from each other in a circumferential direction of said hub and each of said sets including first and second elements which converge toward each other at an oblique angle radially outwardly of said hub, said first and second elements being at least substantially mirror images of each other with reference to a plane disposed between the first and second elements and including said axis; and means for transmitting torque between said flange and the other of said components.

2. The device of claim 1, wherein at least the internal teeth of said hub contain a plastic material.

3. The device of claim 1, wherein the first and second elements of each of said sets of reinforcing elements make an acute angle.

4. The device of claim 1, wherein the first and second elements of each of said sets of reinforcing elements make at least substantially identical oblique angles.

5. The device of claim 1, wherein said means for transmitting torque between said flange and said other component is remote from said hub.

6. The device of claim 1, wherein said means for transmitting torque between said flange and said other component includes enlarged portions of the first and second elements of each of said sets, said enlarged portions being remote from said hub and each of said enlarged portions having at least one through hole extending in substantial parallelism with said axis.

7. The device of claim 6, wherein each of said holes has an axis which is parallel to the axis of said hub and is disposed in the respective plane.

8. The device of claim 1, wherein said flange further comprises a rim surrounding said sets and said torque transmitting means, the first and second elements of each of said sets of reinforcing elements diverging from each other in a direction from said rim toward said hub.

9. The device of claim 8, wherein said torque transmitting means includes enlarged portions of said elements, said enlarged portions being of one piece with said rim and having holes for fasteners arranged to secure said flange to said other component.

10. The device of claim 9, wherein said rim has two end faces disposed in parallel planes which are at least substantially normal to said axis, each of said enlarged portions extending all the way between said parallel planes.

11. The device of claim 10, wherein each of said reinforcing elements extends all the way between said parallel planes.

12. The device of claim 1, wherein said flange further comprises a rim having end faces disposed in two parallel planes extending at right angles to said axis, each of said reinforcing elements extending all the way between said parallel planes.

13. The device of claim 1, wherein said hub and said flange consist of a plastic material, said torque transmitting means including metallic inserts in said flange.

14. The device of claim 13, wherein each of said inserts includes a metallic sleeve having an axis at least substantially parallel to the axis of said hub.

15. The device of claim 1, wherein said flange further comprises a disc disposed in a plane which is at least substantially normal to said axis, said disc being of one piece with at least some of said reinforcing elements.

16. The device of claim 15, wherein said disc has a predetermined thickness and said hub has an axial length exceeding said thickness, each of said elements including two portions disposed at opposite sides of said disc.

17. The device of claim 1, wherein one of said components includes a flywheel.

18. The device of claim 1, wherein one of said components forms part of a hydraulic drive.

19. The device of claim 1, wherein each of said sets of reinforcing elements has an apex remote from said hub, said apices being equidistant from each other as seen in said circumferential direction of said hub.

20. The device of claim 1, wherein the number of said sets of reinforcing elements is less than ten.

* * * * *